(12) United States Patent  
Vaitheeswaran et al.

(10) Patent No.: US 8,983,958 B2  
(45) Date of Patent: Mar. 17, 2015

(54) DOCUMENT INDEXING BASED ON CATEGORIZATION AND PRIORITIZATION

(75) Inventors: Ganesh Vaitheeswaran, Bangalore (IN); Arindam Bhattacharjee, Bangalore (IN); Ravichandran Mahadevan, Bangalore (IN); Suresh Pasumarthi, Bangalore (IN)

(73) Assignee: Business Objects Software Limited, Dublin (IE)

( * ) Notice: Subject to any disclaimer, the term of this patent is extended or adjusted under 35 U.S.C. 154(b) by 1159 days.

(21) Appl. No.: 12/642,893

(22) Filed: Dec. 21, 2009

(65) Prior Publication Data

US 2011/0153589 A1 Jun. 23, 2011

(51) Int. Cl.
*G06F 17/30* (2006.01)
*G06F 9/50* (2006.01)

(52) U.S. Cl.
CPC ........ *G06F 17/30705* (2013.01); *G06F 9/5083* (2013.01)
USPC .......................................................... 707/737

(58) Field of Classification Search
USPC .......................................................... 707/737
See application file for complete search history.

(56) References Cited

U.S. PATENT DOCUMENTS

| 6,351,755 | B1* | 2/2002 | Najork et al. | 715/206 |
|---|---|---|---|---|
| 8,296,276 | B2* | 10/2012 | Novak et al. | 707/696 |
| 2002/0065857 | A1* | 5/2002 | Michalewicz et al. | 707/532 |
| 2004/0163034 | A1* | 8/2004 | Colbath et al. | 715/500 |
| 2005/0138552 | A1* | 6/2005 | Venolia | 715/526 |
| 2007/0061319 | A1* | 3/2007 | Bergholz | 707/5 |
| 2008/0147747 | A1* | 6/2008 | Cardamore | 707/200 |
| 2008/0177736 | A1* | 7/2008 | Spangler | 707/5 |
| 2010/0031266 | A1* | 2/2010 | Raspl et al. | 718/105 |
| 2010/0042610 | A1* | 2/2010 | Lakhani et al. | 707/5 |
| 2010/0161570 | A1* | 6/2010 | Novak et al. | 707/696 |
| 2012/0105471 | A1* | 5/2012 | Ford et al. | 345/619 |
| 2012/0109960 | A1* | 5/2012 | Mishina et al. | 707/737 |

* cited by examiner

*Primary Examiner* — James Trujillo
*Assistant Examiner* — Kurt Mueller

(57) ABSTRACT

Disclosed are methods and systems for improving indexing throughput. The methods and systems involve receiving one or more documents for indexing, categorizing the one or more documents based on a document type, a document size and a processing priority, assigning buckets to the categorized one or more documents according to the document type, the document size and the processing priority and scheduling the buckets for processing based on a document type priority, a bucket type and number of threads available to process the buckets.

20 Claims, 8 Drawing Sheets

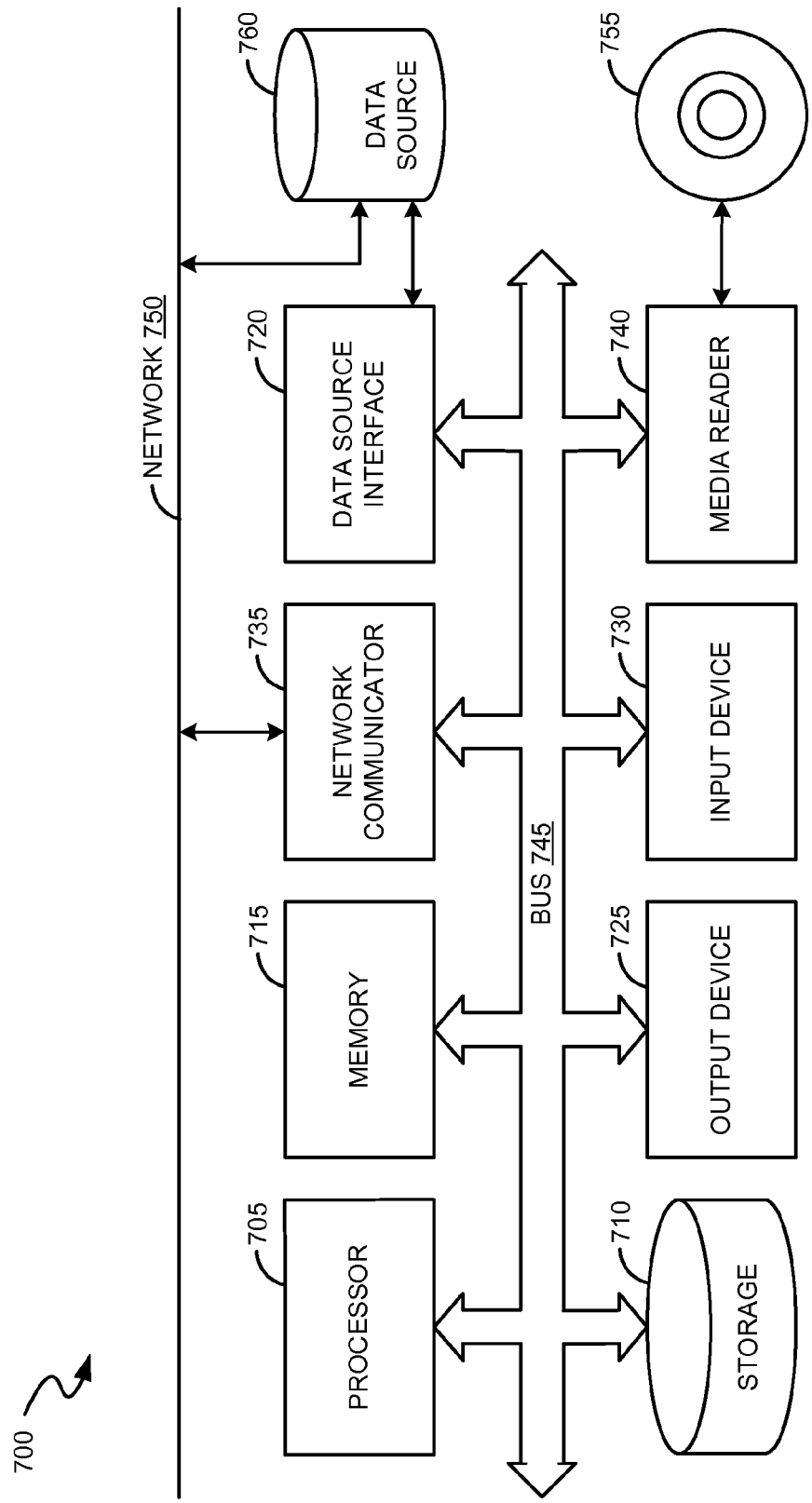

DOCUMENT INDEXING BASED ON CATEGORIZATION AND PRIORITIZATION

TECHNICAL FIELD

The field generally relates to indexing documents to be searched and more specifically to techniques for improving indexing throughput.

BACKGROUND

Business Intelligence (BI) repositories are likely to contain millions of documents. Data from these repositories can be retrieved via a search engine. The search engine typically includes two operations namely searching and indexing. Indexing is a process of exploring the BI repository of documents in real-time, extracting content from the documents and storing the documents in an index. The documents stored in the index are available for searching upon a user's search request. The indexing process is a time consuming and resource consuming process. For instance, indexing a BI repository with a million documents may take a few days or even weeks.

In real-time, resources such as processor and memory available for the indexing process are limited. The resources required for indexing documents exponentially increases with the size of the document. Indexing large BI documents may overload a system to result in out-of-memory conditions, slow down of system processes and may crash system applications. Therefore, indexing large documents increases the indexing time and significantly reduces the number of documents that are available for the user's search request thereby reducing indexing throughput.

SUMMARY

Disclosed are methods and systems for improving indexing throughput. The methods and systems involve receiving one or more documents for indexing, categorizing the one or more documents based on a document type, a document size and processing priority, assigning buckets to the categorized one or more documents according to the document type, the document size and the processing priority and scheduling buckets for processing based on a document type priority, bucket type and number of threads available to process the buckets.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 7 is a block diagram of an exemplary computer system according an embodiment of the invention.

DETAILED DESCRIPTION

Figure 1:
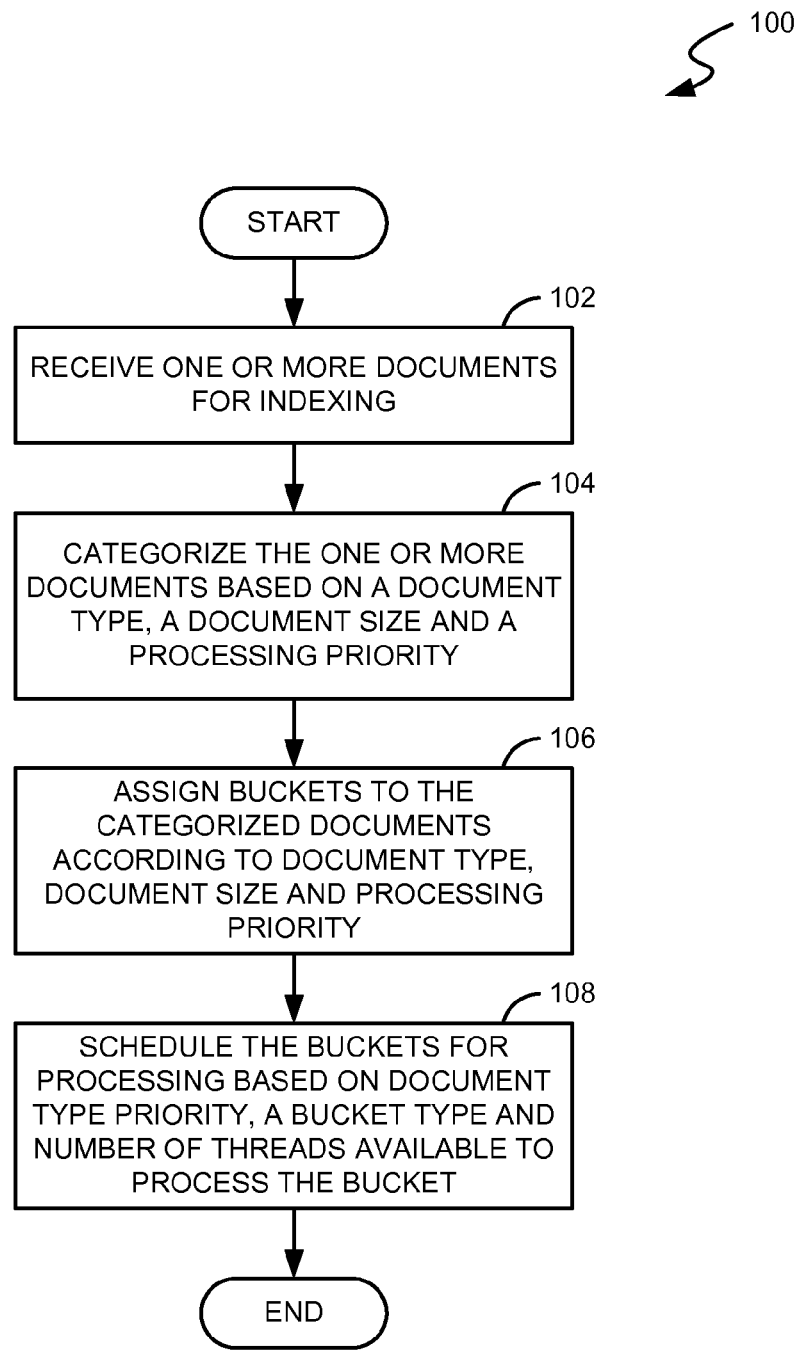
FIG. 1 is a flow diagram illustrating an exemplary method for improving indexing throughput.

Embodiments of techniques for improving indexing throughput are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Many of the examples used herein to describe the various aspects and embodiments of the techniques for document indexing based on categorization and prioritization are based in the subject of Business Intelligence. However, one of ordinary skill in the art will recognize that the techniques and principles described herein can be applied to any other type of documents.

Large repositories such as Business Intelligence (BI) repositories include millions of documents. BI users are able to access the data in the BI repositories through a search request. A typical search engine performs two main processes namely searching and indexing. For a BI document to be available immediately in response to the user request, the BI document should be indexed as soon as it is available. Thus, it is desirable to improve the overall throughput of indexing to index as many documents as quickly as possible. The BI repositories are never static. During its lifetime, BI documents are added, modified and deleted from the BI repositories constantly. The BI document includes meta-data and static content along with the main contents. The meta-data may include but are not limited to the title, author, description, type and last modified timestamp of the document. The static content may include but are not limited to section headers, page headers and footers, table titles, table headers, chart titles, legend titles.

The speed of indexing a given BI document may depend on several factors including its size, the type of document it is and also on the resources that are available for the indexing process. The size of the BI documents may range from kilobytes to megabytes. Indexing throughput is a measure of extracting maximum content of the BI documents that is made available to the user in a least amount of time. The time taken to extract the content of the BI document may increase exponentially with the size of the document. The indexing process also depends on the type of documents that are being indexed. The different types of BI documents may include but are not limited to Web Intelligence reports, Crystal Reports, PDF documents, word documents, etc. For instance, indexing a BI word document may require less time and resources when compared to a Web Intelligence report of the same size.

The indexing process also depends on processor and memory resources available to index BI documents. Another aspect of the indexing process is to minimize indexing load of the system. Indexing load can be defined as the resources of the system such as processor threshold, memory threshold and number of threads available for extracting content from the BI document that are assigned to perform the indexing process. The indexing load can be specified so that indexing and associated processes consume the optimal amount of resources available. The indexing process is regulated by controlling the indexing load. This is achieved by improving or decreasing the number of threads that are available for BI content extraction.

FIG. 1 is a flow diagram illustrating an exemplary method for improving indexing throughput. At process block 102, one or more documents are received for indexing. A repository containing one or more documents is explored in real-time and the one or more documents are batched for indexing. Batching the one or more documents reduces the total time of extraction and indexing. At process block 104, the one or more documents are categorized based on a document type, a document size and processing priority. The document type may be, but is not limited to, Web Intelligence reports, Crystal Reports, PDF documents, word documents, etc. The processing priority of the document is fast or slow. At process block 106, buckets are assigned to the categorized one or more documents. The buckets are assigned according to the document type, document size and processing priority. The different types of documents are put into their respective individual buckets. For instance, PDF documents are put into PDF buckets whereas as Crystal Reports are put into Crystal Reports buckets. The PDF buckets include a fast PDF bucket and a slow PDF bucket according to the processing priority. Small sized documents are prioritized over large sized documents. The small sized documents are put into fast buckets by default. Large documents consuming more processing time and resources are put into slow buckets. Thus, the buckets are assigned based on a combination of the document type, document size and processing priority. For instance, a large PDF document with a slow processing priority is put into a slow PDF bucket.

In an embodiment, when content is extracted from the one or more documents, the time taken for extraction is measured and stored. If the document consumes too much memory or if the extraction fails, the failure information is recorded. If extraction failed due to long processing time, consumed too much memory or resulted in any other error, the processing priority for that document is reduced to slow. Thus, a processing priority for a particular document may be determined not only based on its size but also by an actual observation of the time taken to extract its content. As a result, even small documents can have slow extraction times and be relegated to the slow prioritization category.

At process block 108, the buckets are scheduled for processing based on a document type priority, bucket type and number of threads available to process the bucket. The document type priority is calculated for different document types. For instance, the document type priority is calculated for PDF, Crystal Reports and word documents. If the document priority for the PDF document is more, the PDF documents are prioritized over Crystal Reports and word documents for scheduling. The document type priority depends on the extraction efficiency required to extract content from the documents. The extraction efficiency varies for different document types. The extraction efficiency for a document type is defined as the ratio of the cumulative extraction time for all documents of that type to the cumulative size of all extracted documents of that type.

The extraction efficiency $E_{Tk}$ of a document type $T_k$ is calculated using equation $$E_{Tk} = \frac{\sum_{i=1}^{n} \frac{S_i}{t_i}}{n} \qquad (2)$$

where n is the number of extracted documents of type $T_k$
$S_i$ is the size of the $i^{th}$ document
$t_i$ is the extraction time for the $i^{th}$ document.

The document type priority $P_{Tk}$ for type $T_k$ is calculated using equation $$P_{Tk} = \frac{E_{Tk}}{\sum_{j=1}^{m} E_{Tj}} \qquad (3)$$

where $E_{Tk}$ is the extraction efficiency of type $T_k$,
m is the number of document types and
$E_{Tj}$ is the extraction efficiency of type $T_j$.

Fast buckets are prioritized over slow buckets during processing. Multiple buckets can be processed concurrently. The number of threads available to process the bucket is determined based on an indexing load of a system. The indexing load of the system specifies a processor threshold and a memory threshold of the system to handle the indexing process.

Below is an exemplary business scenario of the scheduling process based on the document type priority, bucket and number of threads available to process the buckets. Consider three types of documents: PDF, Crystal Reports and word documents. When document type priority is calculated for these document types, the PDF documents have the first priority, the word documents and Crystal Reports have the second and third priority respectively. Therefore, the PDF documents are first scheduled for processing. Then PDF buckets are considered. Processing priority and size of the document in the buckets are also taken into consideration. Fast PDF buckets are preferred over slow PDF buckets for processing. Fast PDF buckets may have separate buckets for small sized PDF documents and large sized PDF documents. Then fast PDF buckets having small sized PDF documents are processed based on number of threads available for processing.

Figure 2:
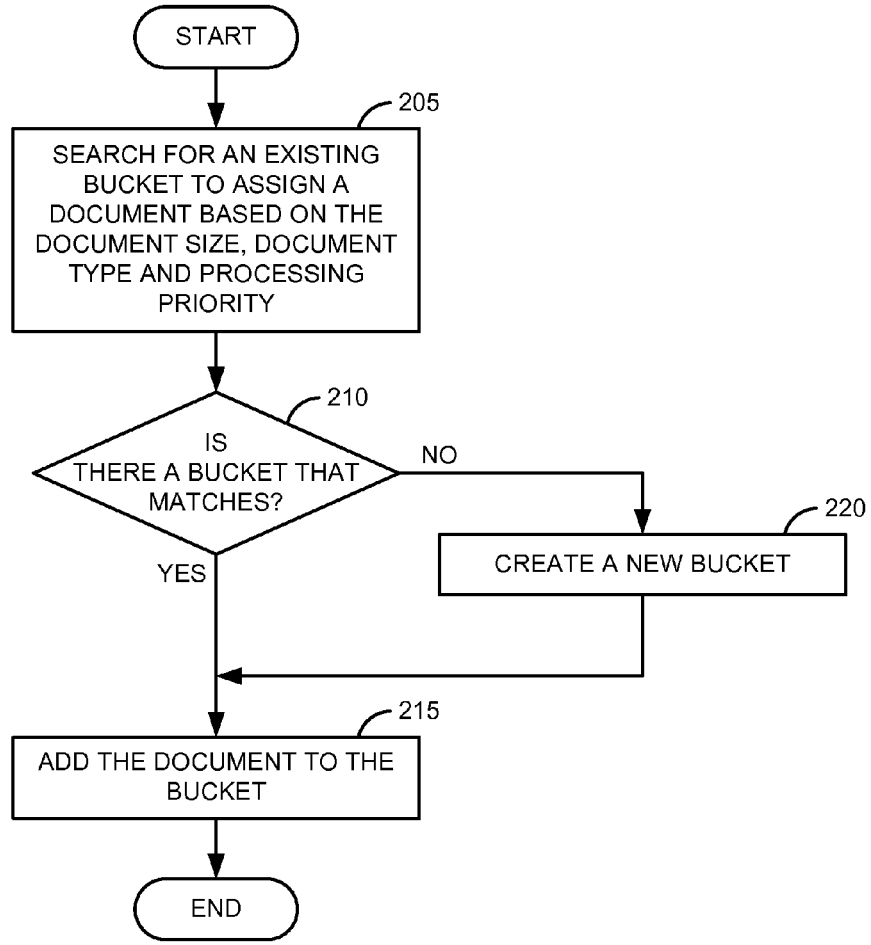
FIG. 2 is a flow diagram illustrating an exemplary method for assigning a bucket to the document according to an embodiment of the invention.

FIG. 2 is a flow diagram illustrating an exemplary method for assigning a bucket to the document according to an embodiment of the invention. At process block 205, an existing bucket is searched to assign to the document based on the document size, document type and processing priority. At decision block 210, it is determined if there are any matching buckets. If a matching bucket is found, the process proceeds to process block 215. At process block 215, the document is added to the matching bucket. If a matching bucket is not found, the process proceeds to process block 220. At process block 220, a new bucket is created. At process block 220 the bucket is created based on the document size, document type and processing priority. The process proceeds to process block 215, where the document is added to the new bucket.

Figure 3A:
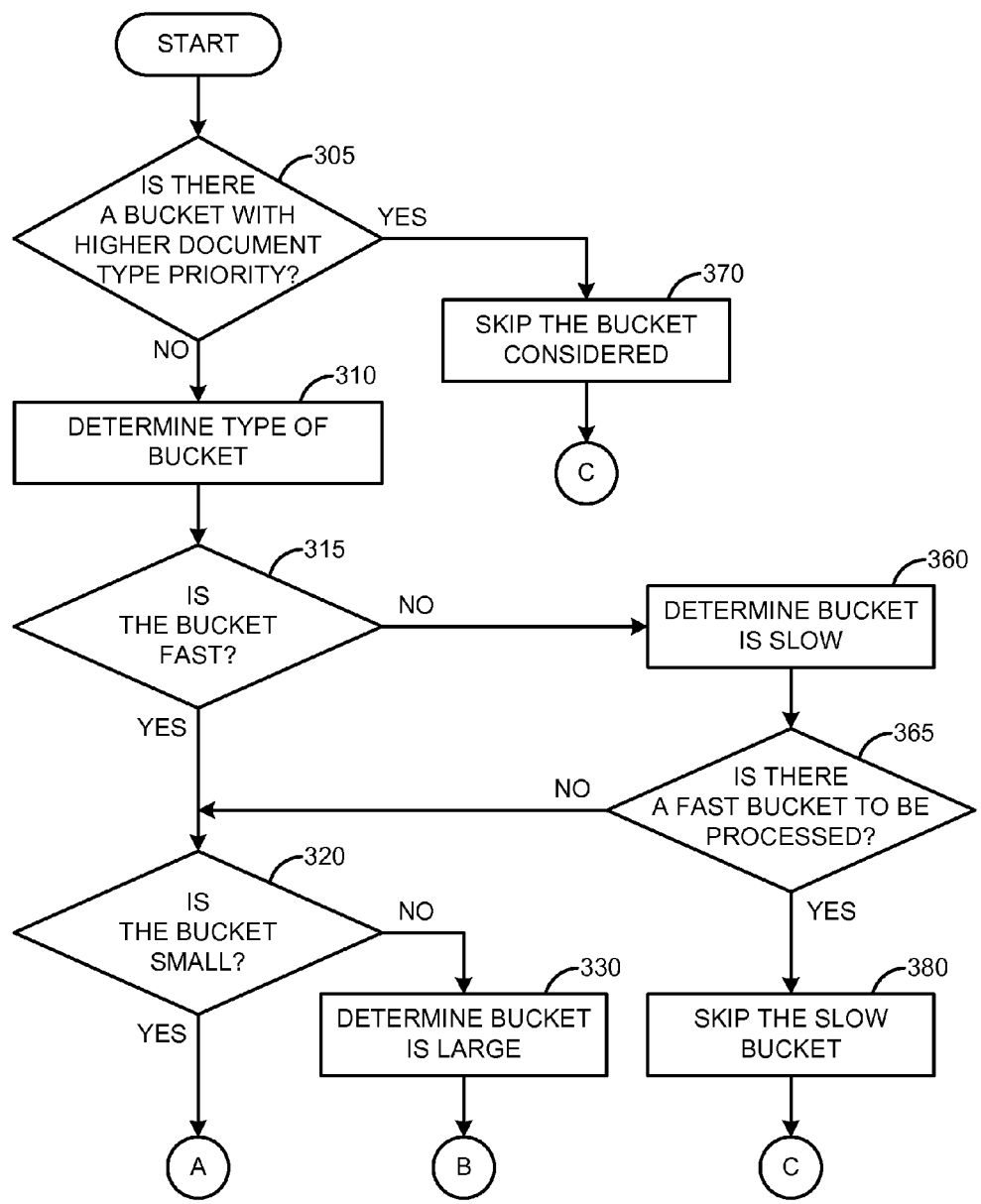
FIGS. 3A and 3B are flow diagrams illustrating an exemplary method for processing the bucket according to an embodiment of the invention.
Figure 3B:
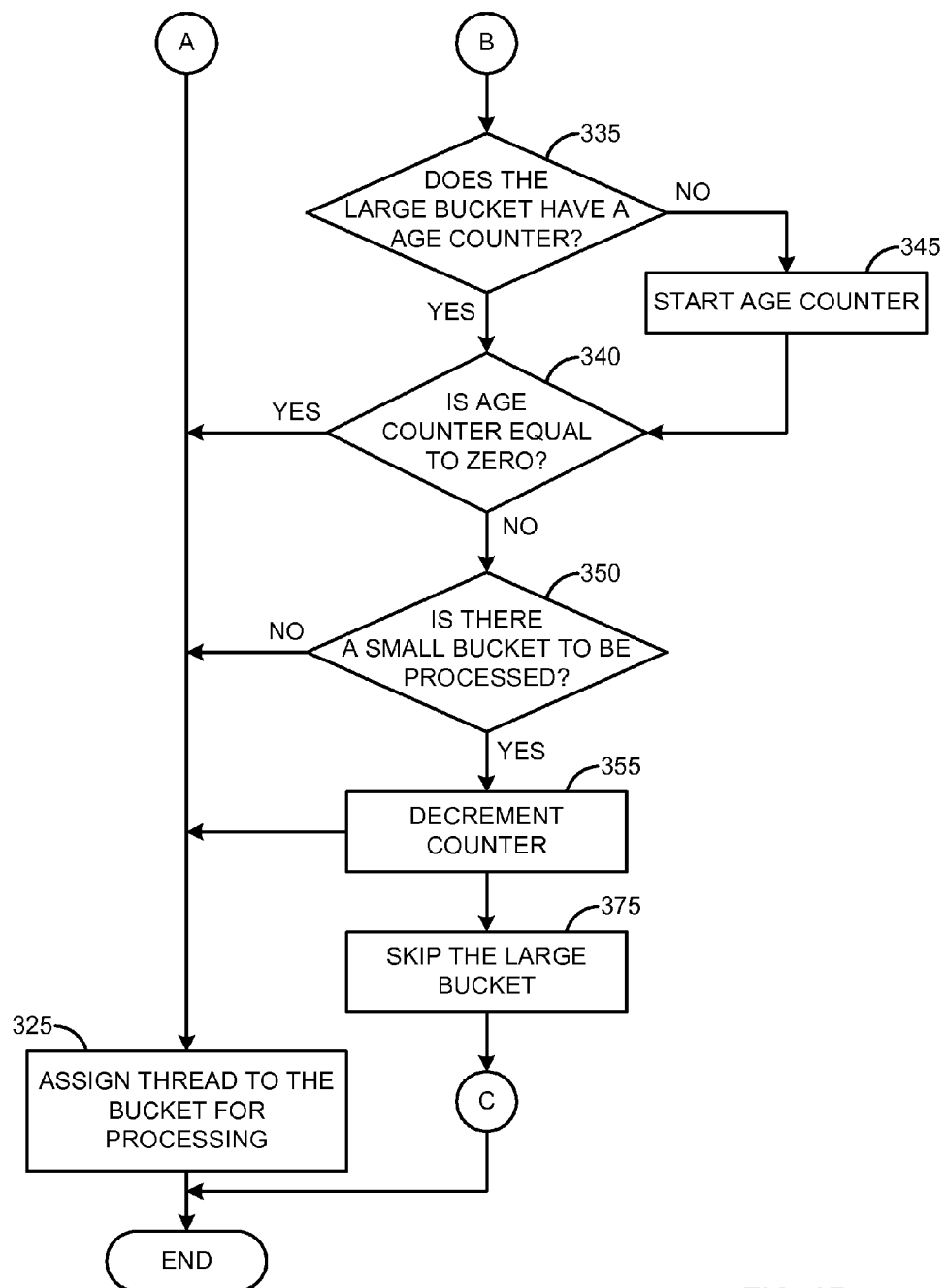

FIGS. 3A and 3B are flow diagrams illustrating an exemplary method for processing the bucket according to an embodiment of the invention. At decision block 305, it is determined if there is a bucket with high document priority. If no, the process proceeds to process block 310. At process block 310, a bucket type is determined. The bucket and the documents it contains are categorized based on the document type, document size and processing priority. Thus, buckets contain documents of similar type, size and prioritization category. Based on prioritization categories, a bucket is either a fast bucket or slow bucket. At decision block 315, it is checked if the bucket is fast. If the bucket is fast, the process proceeds to decision block 320, to check if the bucket is small. If the bucket is small the process proceeds to process block 325, to assign a thread to the small, fast bucket for immediate processing. So small, fast buckets are typically prioritized over the large, fast buckets for immediate processing. The small buckets are not assigned a thread immediately. The small buckets that are waiting in a queue to be processed are also considered. Then according to the algorithm one of the small buckets is picked for processing.

At decision block 305, if there is a bucket with high document priority, the process proceeds to process block 370. At process block 370 bucket considered is skipped and the process is ended.

At decision block 320, if the bucket is not small, the process proceeds to process block 330. At process block 330, the bucket is determined as a large bucket. At decision block 335 it is checked if there is an age counter for the large bucket. If there is no age counter, then the age counter is started at process block 345 before processing the large bucket. When a large bucket is determined, the age counter is initialized to an initial age. In one embodiment, the initial age of the counter is set to five. Other suitable numbers may be configured by an administrator with knowledge about the particular circumstances surrounding the indexing process. Every time this bucket is skipped in favor of other small buckets, the age counter is decremented. When the counter becomes 0, the bucket is processed. The process then proceeds to decision block 340, to check if the age counter is zero. If the age counter is zero, the process proceeds to process block 325, to assign the thread to the large bucket for processing. If the counter is not zero, the process proceeds to decision block 350. At decision block 350, it is checked if there are any small buckets waiting to be processed. If there are any small buckets waiting to be processed, the process proceeds to process block 355 to decrement the age counter of the large bucket. The process proceeds to process block 375 to skip the large bucket and the process is ended. On decrementing the age counter, thread is assigned to the small bucket for processing. If there is no small bucket to be processed the process directly proceeds to process block 325 to assign a thread for processing the large bucket.

At decision block 315, if the bucket is not fast, the process proceeds to process block 360. At process block 360, the bucket is determined as a slow bucket. The process proceeds to decision block 365 to check if there is a fast bucket to be processed. At decision block 365, if there is a fast bucket to be processed the process proceeds to process block 380 to skip the slow bucket and the process is ended. If there is no fast bucket to be processed then the process proceeds to decision block 320.

The buckets that are skipped are picked up again during scheduling process. The scheduling process runs at regular intervals. The interval for the scheduling process is configurable. In an embodiment the interval is set to 10 seconds.

Figure 4:
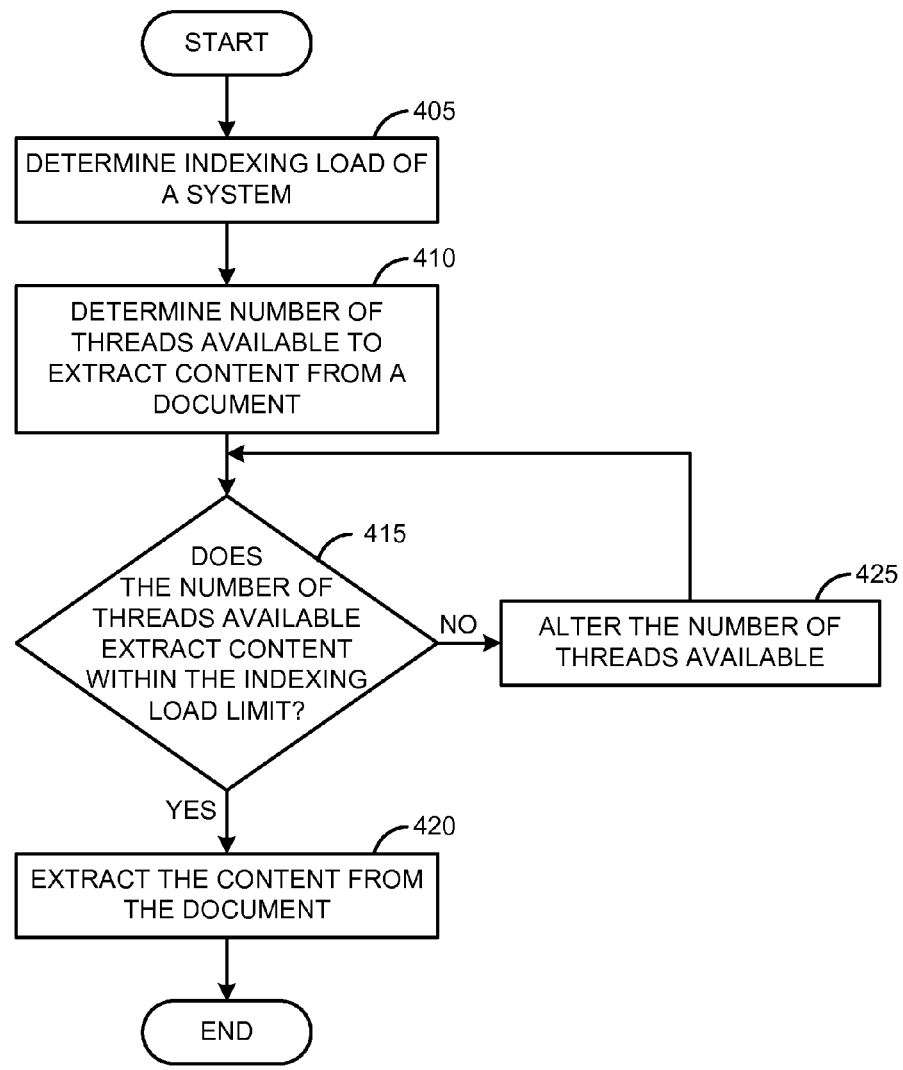
FIG. 4 is a flow diagram illustrating an exemplary method for regulating an indexing load on a system according to an embodiment of the invention.

FIG. 4 is a flow diagram illustrating an exemplary method for regulating an indexing load on a system according to an embodiment of the invention. While processing the buckets the indexing load of the system is regulated. The indexing load includes a processor threshold and a memory threshold specified by the system to handle the indexing process.

The indexing load on the system is regulated for processing the categorized documents by altering the number of threads available to extract contents from the categorized one or more documents when buckets are scheduled for processing. Altering the number of threads available for extracting contents of the categorized one or more documents includes increasing or decreasing the number of threads for extracting contents from the documents according to the indexing load.

The number of threads available to process the bucket is calculated using $$N_{t1} = \min(N_{t0} * L/L_{t1-t0}, N_{t0} * M/M_{t1-t0}) \quad (1)$$

where:
t1 is the current system time,
t0 is the system time at which the number of threads are calculated,
$N_{t0}$ is the number of threads that are currently running,
L is the processor threshold,
$L_{t1-t0}$ is the average processor load on the system due to indexing during the interval t1-t0,
M is the memory threshold,
$M_{t1-t1}$ is the average memory load on the system due to indexing during the interval t1-t0.

Below is an exemplary scenario of altering the number of threads available for extracting contents of the categorized one or more BI documents. Assume a system has 2 processors and a memory of 4 GB. Suppose the initial number of threads is 8(4*number of processors). Consider processor load threshold L is 50% and the memory threshold M is 40%. This implies that the maximum processor load and memory consumed should be within 50% and 40% respectively. After allowing the processes to run for some period of time, the average processor load and memory consumption are calculated.

Assume that the calculated average processor load and the average memory load is 80% and 20% respectively. Substitute the obtained values in equation (1):

$$N_{t1} = \min(8 * (50/80), 8 * (40/20))$$
$$= \min(5, 16)$$
$$= 5$$

In this scenario the number of threads available for extraction is reduced from 8 to 5.

Assume another exemplary scenario where the calculated average processor load and the average memory load is 20%. Substituting the values in equation (1) results in $$N_{t1} = \min(8 * (50/20), 8 * (40/20))$$
$$= \min(20, 16)$$
$$= 16$$

In this scenario the number of threads available for extraction is increased from 8 to 16.

At process block 405, the indexing load of a system is determined. At process block 410, the number of threads available to process the bucket is determined. At decision block 415 it is checked if the number of threads available processes the bucket within the indexing load limit. If yes, the process proceeds to process block 420 to process the bucket. If no, the process proceeds to process block 425 to alter the number of threads available. The process again proceeds to decision block 415.

Figure 5:
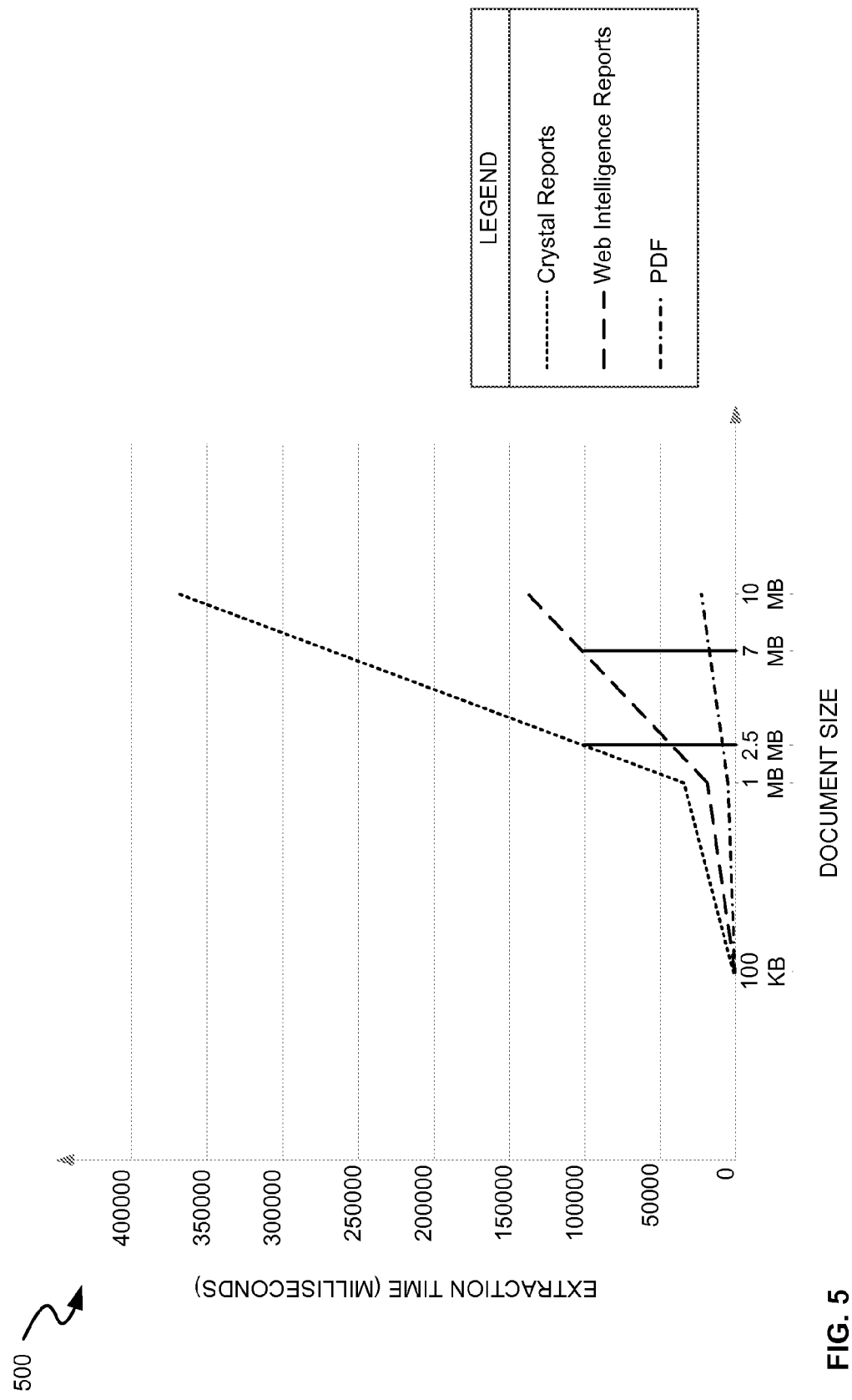
FIG. 5 is a block diagram illustrating an exemplary method for calculating small document type limit according to an embodiment of the invention.

FIG. 5 is a block diagram illustrating an exemplary method for calculating the small document type limit according to an embodiment of the invention. The small document limit for a document type is calculated during the indexing process. The small document limit is analyzed from samples recorded. The samples include extraction time of the BI document along with the size of the BI document. The samples are illustrated in line graphs. The size of the BI document is illustrated along the x-axis and the extraction time is illustrated along the y-axis. A target extraction time limit is specified to calculate the small document limit. Assume that the target extraction time in this scenario is 100000 milliseconds. From graph 500, the small size limit for document types PDF, Web Intelligence reports and Crystal Reports can be inferred. According to the graph 500 all PDF documents meet the small size limit. The small size limit for a Web Intelligence report is equal to 7 MB and the small size limit for a Crystal Reports documents is equal to 2.5 MB.

Figure 6:
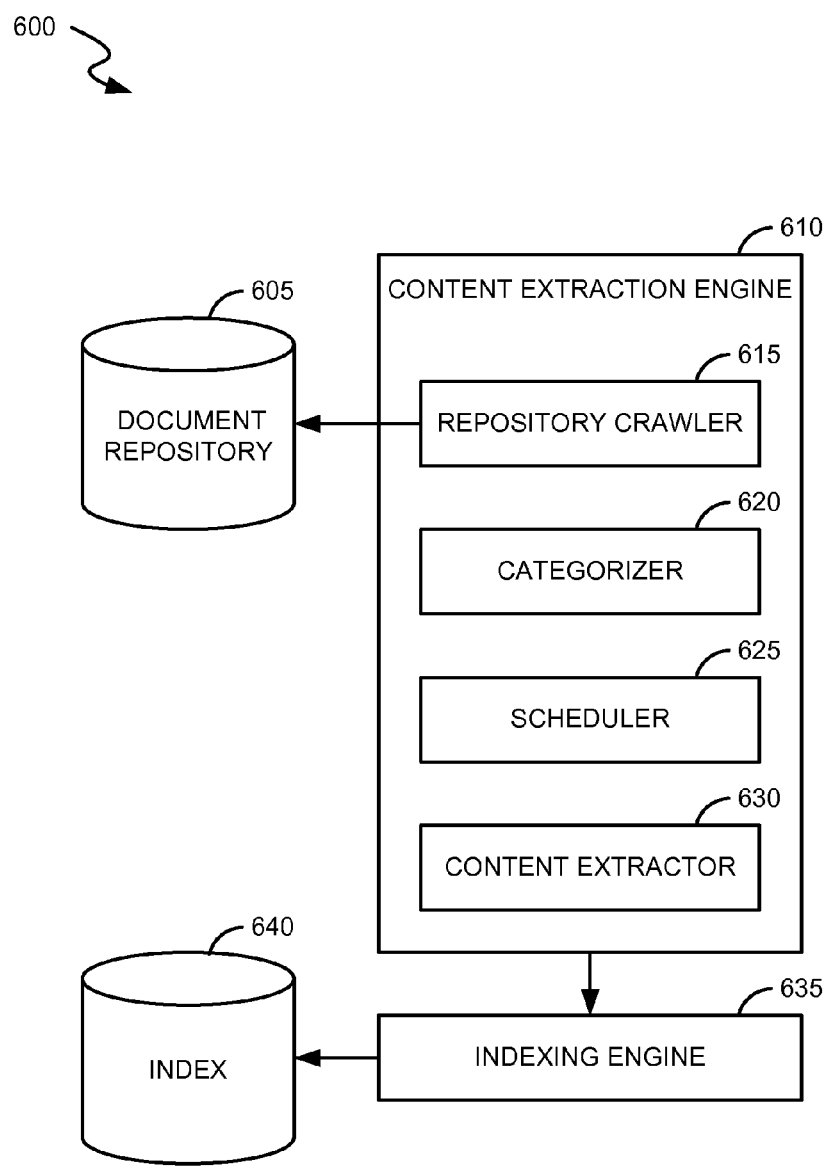
FIG. 6 illustrates an exemplary computer system for improving indexing throughput according to an embodiment of the invention.

FIG. 6 illustrates an exemplary computer system for improving indexing throughput according to an embodiment of the invention. The computer system 600 includes a data repository 605, a content extraction engine 610, an indexing engine 635 and an index 640. The content extraction engine 610 further includes repository crawler 615, categorizer 620, scheduler 625 and content extractor 630.

The data repository 605 includes meta-data and content of one or more documents to be indexed. The documents include but are not restricted to Web Intelligence reports, Crystal Reports, PDF documents, word documents, etc. A processor (not shown in the figure) in communication with the memory and storage may include instructions for the content extraction engine 610 and indexing engine 635 to perform required operations. The repository crawler 615 in the content extraction engine 610 retrieves the one or more documents from the data repository 605. The categorizer 620 categorizes the retrieved one or more documents based on the document type, document size and processing priority. The categorizer 620 assigns buckets for the categorized documents. The categorized one or more documents are assigned to fast or slow buckets based on the document type, document size and processing priority. The buckets are in-memory objects. Multiple buckets can be processed concurrently. Scheduler 625 specifies an order according to which the buckets are processed. The content extractor 630, extracts the content from the one or more documents in the buckets and converts them into a standard XML form in preparation for indexing, and stores the extracted content. In an embodiment the extracted content is stored in temporary files on the file system. The content extractor 630 uses multiple threads for extracting content from one or more documents. These threads consume processor and memory resources. The number of extraction threads are regulated to keep processor and memory consumption under a threshold specified for indexing. The number of threads required for extraction can be increased or decreased to maintain an indexing load. The indexing load specifies the processor threshold and memory threshold required to regulate the load of a system for indexing. The indexing engine 635 receives the extracted content of the one or more documents from the content extractor 630 in the form of XML files. The extracted content is indexed and added to the index 640. The index 640 is a repository where the one or more indexed documents are stored. The content in the index 640 is available as a search response to a user's search request.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

FIG. 7 is a block diagram of an exemplary computer system 700 according an embodiment of the invention. The computer system 700 includes a processor 705 that executes software instructions or code stored on a computer readable medium 755 to perform the above-illustrated methods of the invention. The computer system 700 includes a media reader 740 to read the instructions from the computer readable medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interacting with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture, comprising:
   a machine readable non-transient storage medium comprising instructions which when executed by the machine causes the machine to perform operations comprising:
   receiving one or more documents for indexing;
   based on a document type, a document size and processing priority, categorizing the one or more documents;
   assigning buckets to the categorized one or more documents according to the document type, the document size and the processing priority;
   calculating a document type priority for the document type of the one or more documents in the assigned buckets, wherein the document type priority is calculated as a function of an extraction efficiency for extracting content from the one or more documents for the corresponding document type; and
   based on the calculated document type priority, a bucket type and number of threads available to process the buckets, scheduling the buckets for indexing process.

2. The article of manufacture in claim 1, wherein receiving the one or more documents comprises batching the one or more documents.

3. The article of manufacture in claim 1, wherein categorizing the one or more documents based on the document type comprises calculating a small document limit for the document type.

4. The article of manufacture in claim 1, wherein scheduling the buckets for the indexing process comprises prioritizing fast buckets over slow buckets according to the calculated document type priority.

5. The article of manufacture in claim 1, wherein scheduling the buckets for the indexing process comprises regulating an indexing load on a system for indexing the categorized one or more documents by altering the number of threads available to extract content of the categorized one or more documents.

6. The article of manufacture in claim 5, wherein altering the number of threads available for extracting content of the categorized one or more documents comprises increasing the number of threads for extracting content from the one or more documents according to the indexing load.

7. The article of manufacture in claim 5, wherein altering the number of threads available for extracting content of the categorized one or more documents comprises decreasing the number of threads for extracting content from the one or more documents according to the indexing load.

8. A computer system for improving indexing throughput, the computer system comprising:
   a document repository to store one or more documents;
   a processor;
   at least one memory and storage in communication with the processor, storing:
   a repository crawler in a content extraction engine executable on the processor to receive one or more documents from the document repository;
   a categorizer in the content extraction engine executable on the processor to categorize the one or more documents based on document type, document size and processing priority, and to assign buckets to the categorized one or more documents;
   the processor calculating a document type priority for the document type of the one or more documents in the assigned buckets, wherein the document type priority is calculated as a function of an extraction efficiency for extracting content from the one or more documents for the corresponding document type;
   a scheduler in the content extraction engine executable on the processor to schedule the categorized one or more documents for indexing according to a bucket type, the calculated document type priority and number of threads available to process the bucket;
   a content extractor in the content extraction engine executable on the processor to extract content from the categorized one or more documents;

an indexing engine to index the categorized one or more documents; and an index to store the one or more indexed documents.

9. The computer system of claim 8, wherein the categorizer assigns a fast bucket to the categorized one or more documents.

10. The computer system of claim 8, wherein the categorizer assigns a slow bucket to the categorized one or more documents.

11. The computer system of claim 8, wherein the content extractor comprises threads for extracting content from the one or more documents.

12. A computer implemented method for improving indexing throughput, the computer implemented method comprising:

receiving one or more documents for indexing;

based on a document type, a document size and a processing priority, categorizing the one or more documents;

assigning buckets to the categorized one or more documents according to the document type, the document size and the processing priority;

calculating a document type priority for the document type of the one or more documents in the assigned buckets, wherein the document type priority is calculated as a function of an extraction efficiency for extracting content from the one or more documents for the corresponding document type; and based on the calculated document type priority, a bucket type and number of threads available to process the buckets, scheduling the buckets for indexing process.

13. The computer implemented method of claim 12, wherein categorizing the one or more documents based on the document type comprises calculating a small document limit for the document type.

14. The computer implemented method of claim 13, wherein scheduling the buckets for the indexing process comprises prioritizing fast buckets over slow buckets according to the calculated document type priority.

15. The computer implemented method of claim 12, wherein scheduling the buckets for the indexing process comprises regulating an indexing load on a system for indexing the categorized one or more documents by altering the number of threads available to extract content of the categorized one or more documents.

16. The computer implemented method of claim 12, wherein the indexing load comprises a processor threshold and a memory threshold.

17. The computer implemented method of claim 15, wherein altering the number of threads available for extracting content of the categorized one or more documents comprises increasing the number of threads for extracting content from the one or more documents according to the indexing load.

18. The computer implemented method of claim 15, wherein altering number of threads available for extracting content of the categorized one or more documents comprises decreasing the number of threads for extracting content from the one or more documents according to the indexing load.

19. The article of manufacture in claim 1, wherein the extraction efficiency is calculated as a ratio of a cumulative extraction time required for the one or more documents of a particular document type to a cumulative size of the one or more documents of that particular document type.

20. The article of manufacture in claim 1, wherein the number of threads available to process the buckets is calculated as a minimum of:

a first product of a number of threads running at a particular instance of time and a first quotient of a processor threshold to a calculated average processor load, and a second product of the number of threads running at that particular instance of time and a second quotient of a memory threshold to a calculated average memory load.

* * * * *